United States Patent [19]

Murakami

[11] Patent Number: 4,761,772
[45] Date of Patent: Aug. 2, 1988

[54] OPTICAL DISK RECORDING AND REPRODUCING APPARATUS RELIABLY PROVIDING ACCESS TO DESIRED TRACKS

[75] Inventor: Hiroyasu Murakami, Yokohama, Japan

[73] Assignee: Kabushiki Kaisha Toshiba, Kawasaki, Japan

[21] Appl. No.: 666,610

[22] Filed: Oct. 30, 1984

[30] Foreign Application Priority Data

Oct. 31, 1983 [JP] Japan .................. 58-203830

[51] Int. Cl.⁴ ................. G11B 21/08; G11B 7/013
[52] U.S. Cl. ......................... 369/32; 369/41; 369/275; 364/200
[58] Field of Search ................. 360/78, 48, 72.2, 60, 360/137; 369/59, 32, 33, 41, 275, 47, 48; 364/200 MS File, 900 MS File

[56] References Cited

U.S. PATENT DOCUMENTS

| | | | |
|---|---|---|---|
| 3,585,606 | 6/1971 | Evans et al. | 364/200 |
| 4,000,510 | 12/1976 | Cheney et al. | 360/72.2 |
| 4,138,741 | 2/1979 | Hedlund et al. | 369/47 |
| 4,215,400 | 7/1980 | Denko | 364/200 |
| 4,229,808 | 10/1980 | Hui | 369/48 |
| 4,262,332 | 4/1981 | Bass et al. | 364/200 |
| 4,535,439 | 8/1985 | Satoh et al. | 369/275 |
| 4,580,253 | 4/1986 | Yoshidome | 369/32 |
| 4,641,294 | 2/1987 | Yoshimaru | 369/32 |

FOREIGN PATENT DOCUMENTS

| | | | |
|---|---|---|---|
| 0054438 | 6/1982 | European Pat. Off. | 369/275 |
| 54-146618 | 11/1979 | Japan | 360/60 |
| 2036410 | 6/1980 | United Kingdom | 369/275 |

Primary Examiner—Raymond F. Cardillo
Assistant Examiner—Steven R. Garland
Attorney, Agent, or Firm—Cushman, Darby & Cushman

[57] ABSTRACT

An optical disk recording and reproducing apparatus includes an optical disk memory and an optical head for writing and reading out data on and from the optical disk memory by accessing onto a track of this optical disk memory and irradiating a laser beam onto a desired track. The tracks of this optical disk memory are divided into a user inaccessible area, and non-recording area, and user accessible area which are respectively provided inside and outside of the user inaccessible area. A plurality of blocks is allocated to each track in these user inaccessible area and user accessible area. Block head data representative of a block position is recorded in each block. When the optical head inadvertently enters the user inaccessible area an operation is performed to reposition the head at the user accessible area.

6 Claims, 7 Drawing Sheets

| MOTOR SPEED | NUMBER OF SECTORS | STARTING SECTOR POSITION | FIRST BLOCK NUMBER |
|---|---|---|---|
| V1 | 40 | 0 | 000000 |
| V2 | 39 | 15 | 002459 |
| V3 | 38 | 40 | 005210 |
| ⋮ | ⋮ | ⋮ | ⋮ |
| Vi | SNi | SSPi | FBNi |
| ⋮ | ⋮ | ⋮ | ⋮ |

OPTICAL DISK RECORDING AND REPRODUCING APPARATUS RELIABLY PROVIDING ACCESS TO DESIRED TRACKS

BACKGROUND OF THE INVENTION

The present invention relates to an optical disk memory device.

Recently, an image information filing apparatus has been developed in which a document or the like is two-dimensionally scanned by a light beam; the image information from this document is converted to an electrical signal; the image data obtained in this way is stored; and the stored image data can be searched and reproduced as necessary. In this kind of image information filing apparatus, an optical disk memory is used as an image memory to store the image data. In this kind of optical disk memory, information is stored on, for example, spiral or coaxial tracks by means of an optical head which rectilinearly moves in the radial direction of this optical disk memory. To determine the memory locations in the optical disk memory, the spiral or coaxial tracks are divided for every block having a fixed data length. A block of address data is preliminarily stored in the head of each block. In this kind of optical disk memory, for example, in the case of reading out data from a desired block, the optical head is accessed near this block and the designated block is detected while reading the track number and block number stored in this accessed region. In this case, when it is assumed that, for instance, the block in the innermost track is designated, there is a possibility that the optical head will search the region (the furthest inner region on the innermost track) where the block number, track number, etc. are not stored. In such a case, obviously, the track number and block number cannot be read out, which causes a problem in that the designated block cannot be accurately detected.

SUMMARY OF THE INVENTION

It is an object of the present invention to provide an optical disk recording and reproducing apparatus which can easily and reliably give access to desired tracks.

This object is accomplished by an optical disk recording and reproducing apparatus comprising: an optical disk memory having a plurality of tracks that are classified into three areas: a non-recording area; a user accessible area; and a user inaccessible area provided between the non-recording area and user accessible area. The tracks in the user inaccessible area and user accessible area are divided by blocks. Block head data representative of a block position is recorded in each block. An optical head writes and reads out recording data on and from the tracks in the user accessible area of the optical disk memory. A head driver drives the optical head. A data processing circuit supplies an energization signal corresponding to the data to be recorded to the optical head, receives a reproduction signal from the optical head, and supplies drive data to the head driver, thereby allowing the optical head to access onto the desired track.

In this invention, blocks are also allocated to the tracks in the user inaccessible area as well as in the user accessible area, and the block head data is stored in each block. Therefore, upon recording or reproduction, even when the optical head is set to the location in the user inaccessible area, the data processing circuit can accurately detect the location of the optical head by reading out the block head data stored in the user inaccessible area. This allows the optical head to easily access onto a desired track.

DETAILED DESCRIPTION OF THE PREFERRED EMBODIMENT

Figure 1:
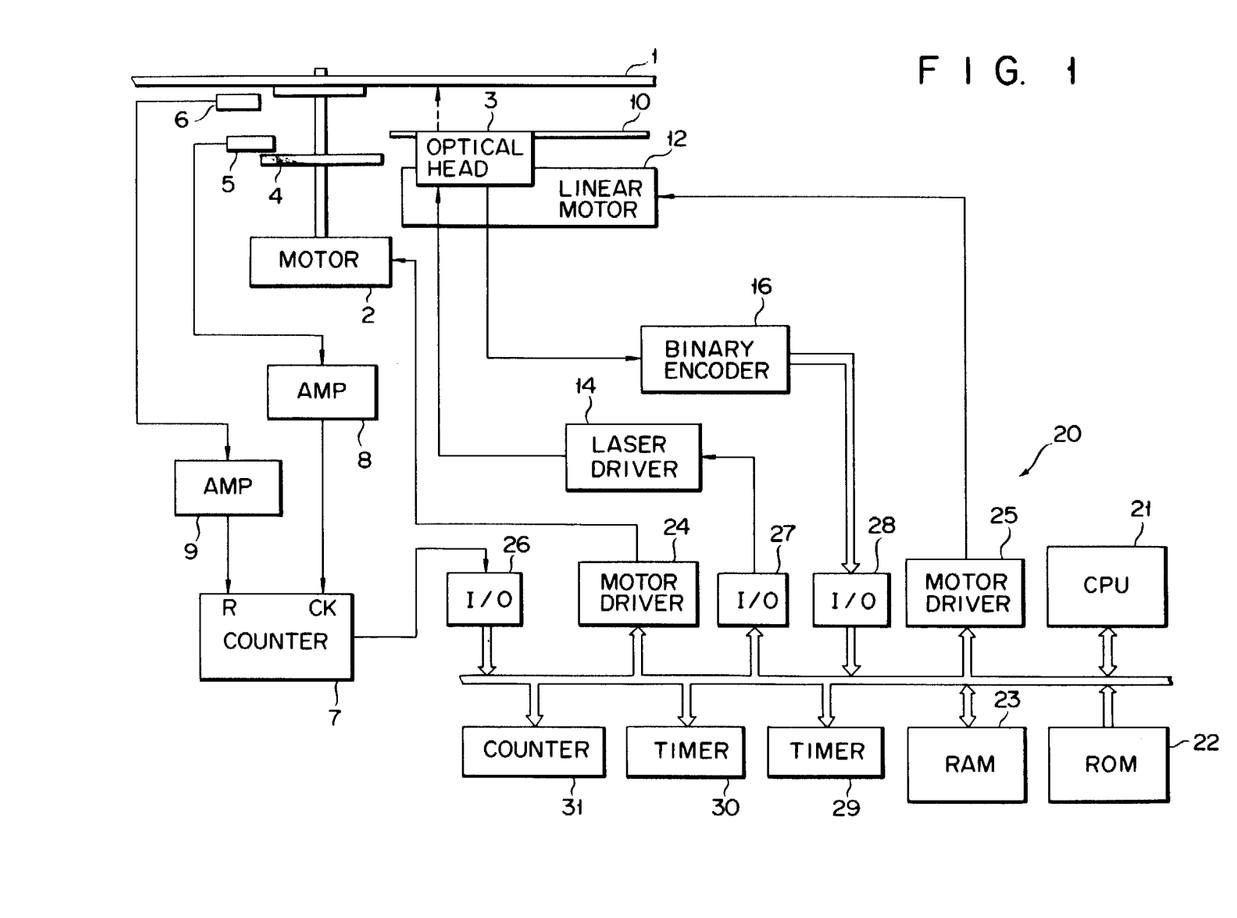
FIG. 1 is a block diagram showing an optical disk recording and reproducing apparatus according to an embodiment of the present invention.

FIG. 1 shows a block diagram of an optical disk memory device according to one embodiment of the present invention. This optical disk memory device comprises: an optical disk memory 1; a disk drive motor 2 for rotating and driving the optical disk memory 1; and an optical head 3 for reading out and writing data from and into the optical disk memory 1.

Figure 2:
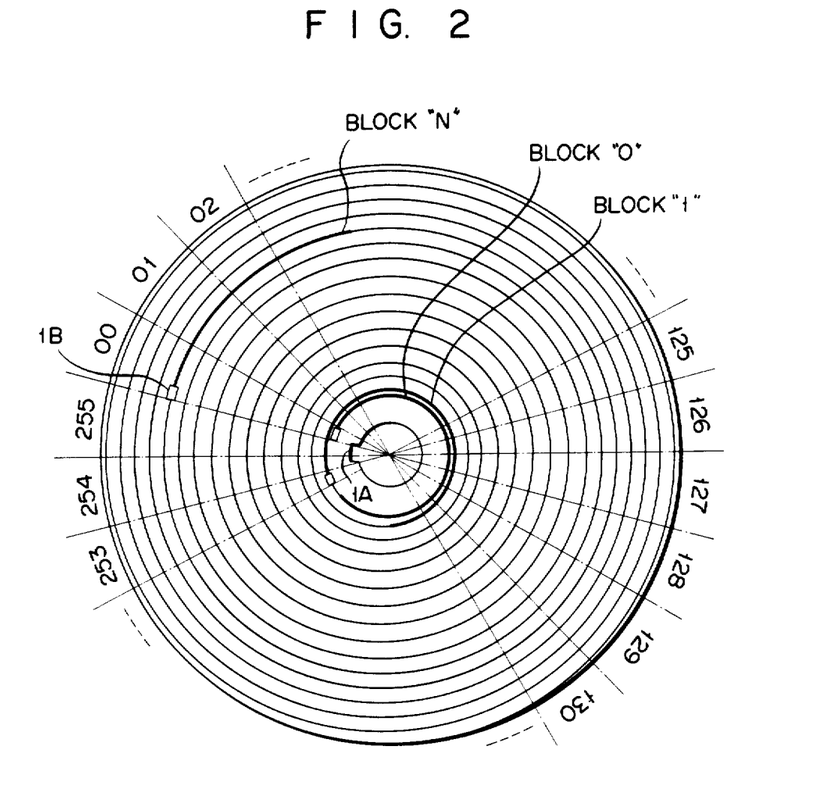
FIG. 2 is a diagram for explaining track blocks and sectors of the optical disk memory shown in FIG. 1.

For example, as schematically illustrated in FIG. 2, the optical disk memory 1 is formed by forming a metal coating layer such as tellurium or bismuth, etc. like a doughnut on the surface of the disk such as glass or plastic. A notched portion 1A which is used as a reference position mark is formed at the inner peripheral portion of the metal coating layer. In contrast, the disk memory 1 is divided into 256 equal sectors from the sector "0" to the sector "255" using the reference position as a start point which was determined by the notched portion 1A. For instance, 36,000 tracks are spirally (or coaxially) set in the optical disk memory 1 and about 0.3 million blocks are allocated along these tracks. These blocks are each allocated so as to include, e.g., about 40 sectors at the innermost rim or the portion near it, and include, e.g., about 20 sectors at the outermost rim or the portion near it. In the case where a certain block does not end on the boundary between the sectors, the next block starts from the next boundary between the sectors in the manner such that a block gap exists between this block and the former block. Block designation data 1B including data regarding the block number, track number and the like is recorded in the start region of each block, for instance, when the optical disk memory 1 is manufactured.

Figure 3:
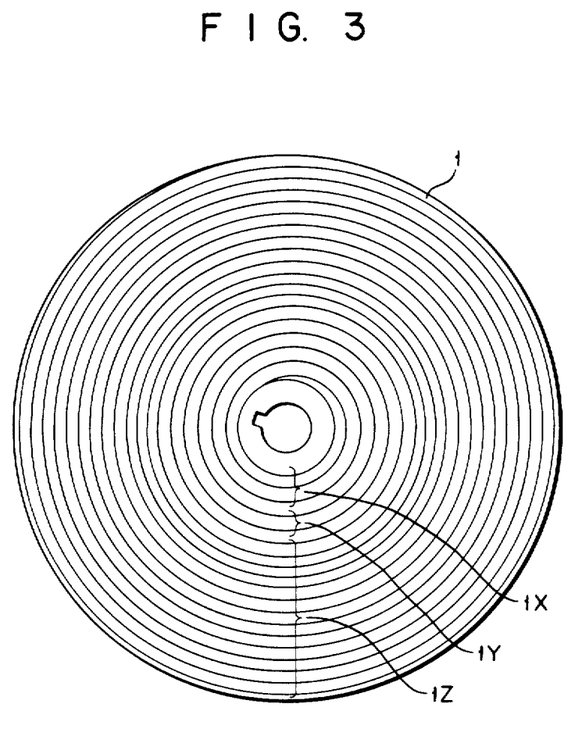
FIG. 3 is a diagram for explaining a non-recording area, a user inaccessible area and a user accessible area on the optical disk memory shown in FIG. 1.

As shown in FIG. 3, the disk memory 1 is segmented into a non-recording area 1X, a user inaccessible area 1Y and a user accessible area 1Z from the innermost track toward the outer track. For instance, the non-recording area 1X includes innermost ten tracks and is used to compensate for the access error which is caused due to eccentricity of the disk memory 1. For instance, the access error can be compensated by detecting a deviation between the reference position of the scale representative of the distance in the radial direction of the disk memory 1 and the innermost track and by deciding the access location considering this deviation.

The user inaccessible area 1Y includes the blocks of the number (for example, 512 blocks) corresponding to the maximum permissible access error caused when the optical head 3 accesses the designated block using a value of the scale as a reference. Only block head data 1B is stored in each block of the user inaccessible area 1Y.

Defective block data is stored in, e.g., the head block of the user accessible area 1Z and the other blocks are used to store image data or the like. This defective block data represents the block number of the defective block and the number of successive defective blocks. The blocks designated by this defective block data are regarded as defective blocks, so that the writing of the image data is inhibited.

Figures 4A, 4B, 4C:
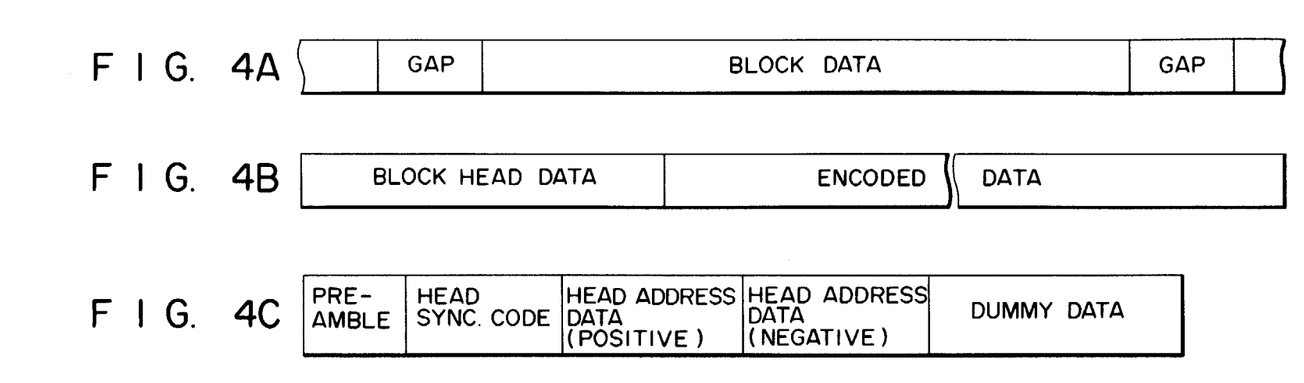
FIGS. 4A to 4D show the formats of data to be recorded in the optical disk memory shown in FIG. 1.

FIGS. 4A to 4D show the formats of data in blocks that are recorded along the track grooves on the optical disk memory 1. As shown in FIG. 4A, a gap is formed between blocks. As shown in FIG. 4B, block head data and encoded data are recorded in this block. As shown in FIG. 4C, this block head data includes for example, preamble data indicative of the existence of the block head data; a head sync code to decide the readout timing; and head address data of the positive and negative phases. The address data of the positive and negative phases means that, for instance, when the positive phase data is represented by "1 0 1 0 1 1," the negative phase data is expressed by "0 1 0 1 0 0." Therefore, when both positive and negative phase head address data are correct, the exclusive OR of the bits in each digit of these address data always becomes "1." In addition, each of these positive and negative phase head address data includes the data indicative of the block number and track number.

Figure 4D:
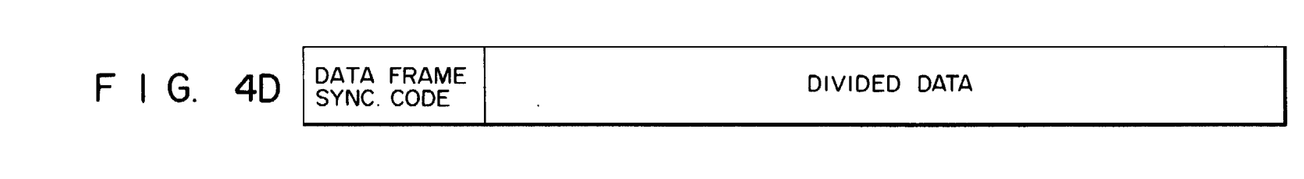

As shown in FIG. 4D, each encoded data area shown in FIG. 4B has a frame sync code to get the frame synchronization and 152 data frames to store partial data divided into image data or the like. Due to this, data of a fixed length in the data block is divided into 152 items of data each having a fixed length and stored in 152 data frames.

Figure 5:
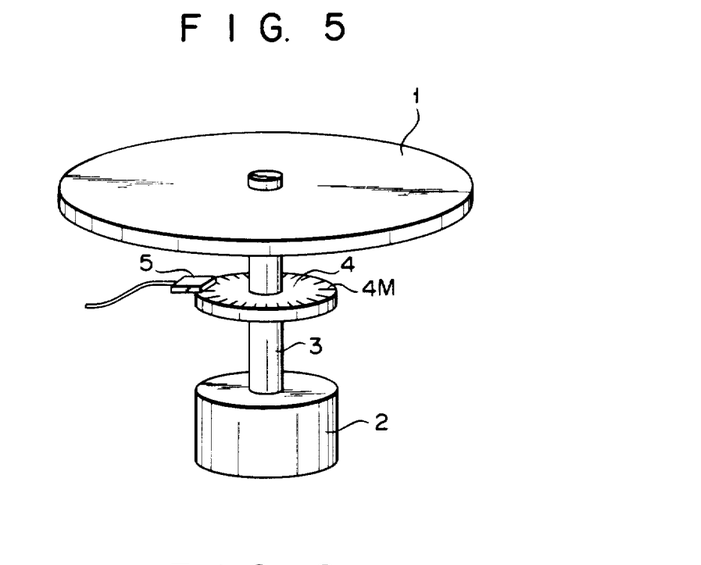
FIG. 5 is a perspective view illustrating the optical disk memory, disk with marks and drive motor shown in FIG. 1.

As shown in FIG. 5, a disk 4 on which 256 marks 4M are formed at regular intervals at the periphery is fixed to the shaft of the disk drive motor 2 shown in FIG. 1. These marks 4M are detected by a detector 5. For example, the detector 5 comprises a light-emitting diode for radiating light onto the marks 4M; and a photosensitive device which generates an output signal when it receives the light reflected from the mark 4M. On the other hand, a detector 6 (shown in FIG. 1) having a light-emitting diode and a photosensitive device is arranged at the lower position of the disk memory 1 in order to optically detect the reference position mark 1A of the optical disk memory 1. The detector 6 generates an output signal when it detects the reference position mark 1A. The output signals of the detectors 5 and 6 are respectively supplied to a clock terminal and a reset terminal of a counter 7 through amplifiers 8 and 9.

Further, a scale 10 is formed at the lower location of the disk memory 1 so as to extend in the radial direction of the disk memory 1. The optical head 3 is attached so as to be driven along the scale 10 by a head drive motor 12. As is well known, the optical head 3 is constituted by a semiconductor laser oscillator; a collimator lens; a beam splitter; λ/4 wavelength plate; an objective lens; a photo-receiving apparatus, etc. The optical head 3 irradiates a laser beam onto the disk memory 1 in response to an energization signal from a laser driver 14 and writes the corresponding data in the writing mode. In contrast, in the readout mode, the optical head 3 irradiates a weak laser beam onto the disk memory 1 and supplies to a binary encoder 16 an electrical signal corresponding to the laser beam which was reflected from the disk memory 1.

The counter 7, laser driver 14 and binary encoder 16 are connected to a data processing circuit 20. The data processing circuit 20 comprises a central processing circuit (CPU) 21; a read only memory (ROM) 22 in which an execution program for the CPU 21 is stored; a random access memory (RAM) 23 to store the data which is used to execute the program by the CPU 100; motor drivers 24 and 25 to drive the motors 2 and 12; I/O ports 26, 27 and 28 coupled respectively to the counter 7, laser driver 14 and binary encoder 16; timers 29 and 30; and a counter 31. Further, the data processing circuit 20 is coupled to a host computer (not shown).

Figure 6:
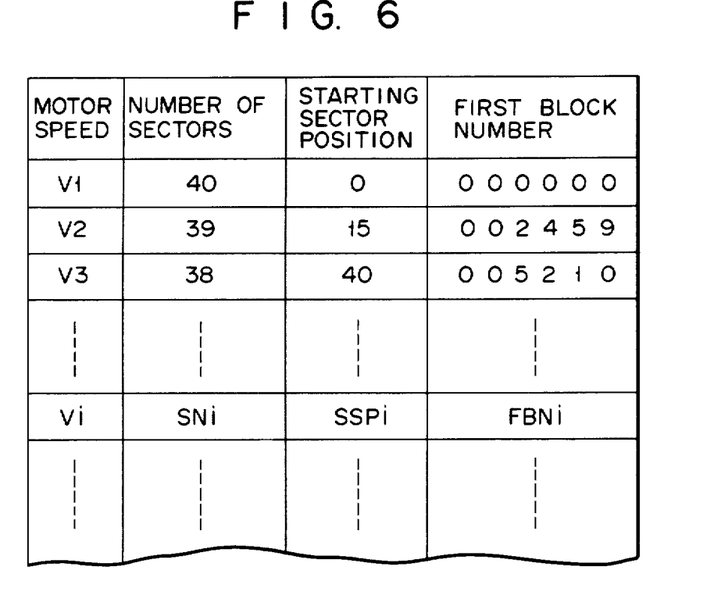
FIG. 6 shows a conversion table stored in the ROM shown in FIG. 1.

As shown in FIG. 6, the data regarding the motor speed, number of sectors, starting sector position, and first block number corresponding to the input block number data is stored in the ROM 22. The speed data $VD_i$ represents the speed $V_i$ which has been preliminarily allocated to one of the track areas in which the track having the block designated by the input block number data is included. The disk memory 1 is always driven at a constant speed $V_i$ when the same speed data $VD_i$ is given. On one hand, 256 tracks are allocated in each track area. The reason why a different speed is given for every track area in this way is to make the linear velocity in each track area, that is, the relative velocity between the corresponding track and the optical head 3 uniform. The number-of-sector data, starting sector position data and first block number data respectively represent the number of sectors contained in each block which is included in the track area $TA_i$ to which the speed $V_i$ was allocated, the starting sector position in this track area $TA_i$, and the first block number in the track area $TA_i$.

When the CPU 21 receives the block number data indicating the block number $BN_i$ from the host computer, it detects the block number $FBN_i$ of the first block in the track area $TA_i$ where the block designated by this block number data exists; the starting sector position $SSP_i$ of this first block; the number $SN_i$ of sectors which each block in the track area $TA_i$ has; and the speed $V_i$ corresponding to the track area $TA_i$ on the basis of the conversion table shown in FIG. 6. The CPU 21 calculates the following equation on the basis of these data.

$$\{(BN_i - FBN_i) \times SN_i + SSP_i\} \div 256 = Q_i + R_i \ldots \quad (1)$$

where, $Q_i$ and $R_i$ are a quotient and a remainder, respectively.

The remainder $R_i$ indicates the starting sector position $SP_i$ of the designated block. By adding the quotient $Q_i$ and the first track number $FTN_i$ in the track area $TA_i$, the track number $TN_i$ of the track where the designated block exists is given in accordance with the following equation.

$$TN_i = Q_i + FTN_i \ldots \quad (2)$$

It is now assumed that the block number data to designate the block number "10" is supplied to the CPU 21 from the host computer. The CPU 21 obtains $FBN_i=0$, $SSP_i=0$ and $SN_i=40$ on the basis of this input block number data and obtains $Q_i$ and $R_i$ from equation (1).

$$\{(10-0)\times 40 + 0\} \div 256 = 1 + 144/256$$

In this case, since $FTN_i$ is 0, $TN_i=1$ and $SP_i=144$. In accordance with the result derived in this way, the CPU 21 gives the drive data to the motor driver 25 to allow the optical head 3 to move to the location designated by the track number "1" and starting sector position "144." In this case, the CPU 21 converts the track number data $TN_i$ to the corresponding scale data; compares it with the scale data indicating the present location of the optical head 3 that has been stored in the RAM 23; and supplies the motor driver 25 with the drive data representative of the rotational amount and rotating direction in accordance with the difference between both scale data. The motor driver 25 rotates the motor 12 using the corresponding rotational angle in the corresponding direction in accordance with drive data from the CPU 21, thereby allowing the optical head 3 to move in the radial direction of the disk memory 1 and permitting the laser beam from the optical head 3 to be irradiated onto the designated track of the disk memory 1. Further, the CPU 21 gives the drive data indicating speed $V_i$ to the motor driver 24, thereby allowing the disk memory 1 to rotate at the speed $V_i$. In response to the rotation of the disk memory 1 and disk 4, the reference position mark 1A of the disk memory 1 and the mark 4M on the disk 4 are respectively detected by the detectors 6 and 5. The counter 7 counts the output pulses which are generated whenever the detector 5 detects the mark 4M and is reset in response to the output pulse which is generated whenever the detector 6 detects the reference position mark. After the optical head 3 is set to the position which accurately corresponds to the designated track, the CPU 21 obtains the content of the counter 7 from equation (1). When the CPU 21 detects that the content of the counter 7 thus obtained coincides with the starting sector position data $SP_i$ stored in the RAM 23, it allows the recording or reproducing operation to be started. As is ordinarily well known, in the recording operation mode, the CPU 21 supplies to the laser driver 14 the modulation data corresponding to the recording data such as the control data, image data and the like from the host computer. In accordance with the modulation data supplied, the laser driver 14 gives an energization signal to a semiconductor laser (not shown) in the optical head 3, thereby allowing the modulated laser beam to be irradiated onto the disk memory 1 from the optical head 3. On the other hand, in the readout operation mode, the electrical signal corresponding to the recording data is given to the binary encoder 16 from the optical head 3 by way of a well known method, so that the binary encoder 16 supplies the binary code responsive to this input signal to the CPU 21. The CPU 21 temporarily stores the binary code from the binary encoder 16 into the RAM 23 or sequentially supplies it to the host computer.

Now will be described a method of recording block head data on the optical disk memory where no data is recorded on each track, and of manufacturing an optical disk memory.

First, the host computer supplies the recording instruction signal for the block head data to the CPU 21. The CPU 21 sets the optical head 3 to, for example, the eleventh track from the innermost track of the disk memory 1, namely, to the innermost track in the user inaccessible area 1Y. The CPU 21 also permits the disk memory 1 to rotate at the speed $V_1$ indicated in the conversion table shown in FIG. 6. When the reference position mark 1A of the disk memory 1 is detected, the CPU 21 allows the block head data representative of the first block to be recorded on the disk memory 1 on the basis of the data format shown in FIG. 4C. Thereafter, the CPU 21 moves the optical head 3 by the corresponding distance in the radial direction while the disk memory 1 is being rotated by 40 sectors, thereby allowing the corresponding block head data to be sequentially recorded on the track of the disk memory 1. In this case, the CPU 21 permits a counter 31 to increase one count whenever each block head data is recorded on the memory disk 1. When the content of the counter 31 becomes a predetermined value, e.g., 2,459, the CPU 21 allows the disk memory 1 to rotate at the speed V2. Whenever 39 sectors elapse, the CPU 21 allows the corresponding block head data to be sequentially recorded on the tracks of the disk memory 1. In a similar manner, whenever the content of the counter 31 reaches the predetermined values, the rotating speed of the disk memory 1 is changed, and the optical head 3 is moved in the radial direction while the disk memory 1 is being rotated, thereby sequentially recording the block head data in each block while tracing on the tracks of the disk memory 1 by the optical head 3. Thus, the corresponding block head data are recorded in about 0.3 million blocks.

A check is made to see if the block head data recorded in this way can be reproduced without errors. The blocks in which the block head data that cannot be accurately reproduced are recorded are determined as the defective blocks. The defective data each indicative of the block number and the number of succeeding defective blocks are recorded in the head block in the user accessible area 1Z.

Figure 7A:
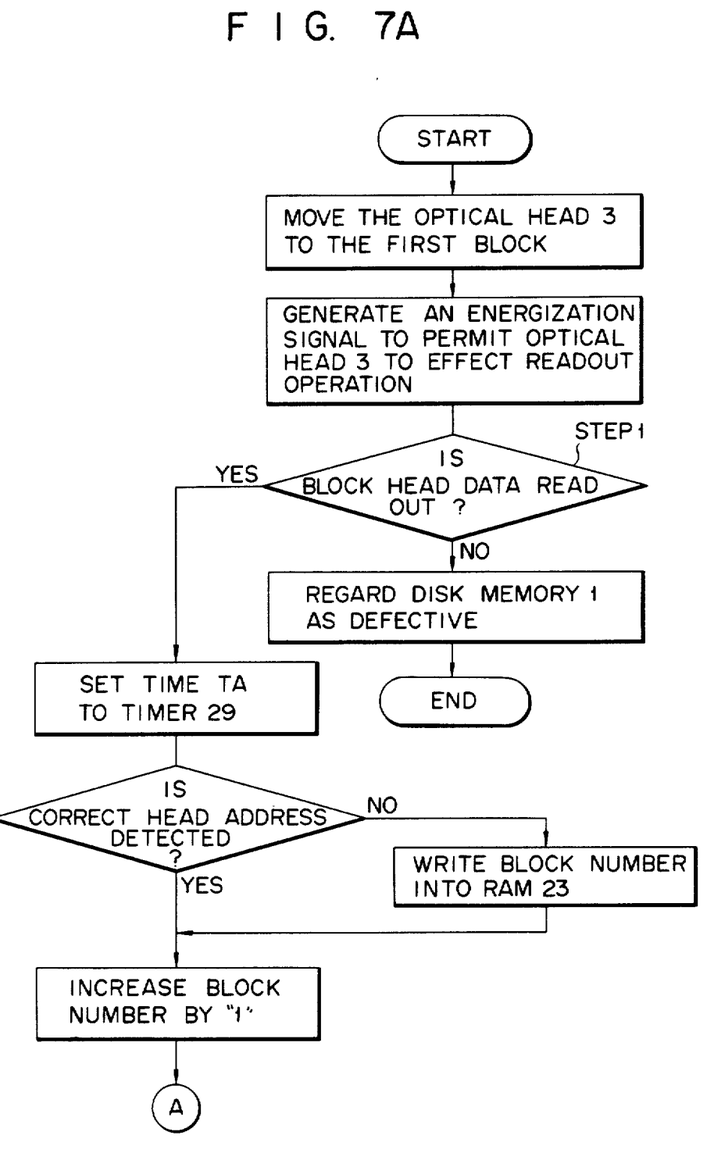
FIGS. 7A and 7B are flow charts showing a method of recording defective block data.
Figure 7B:
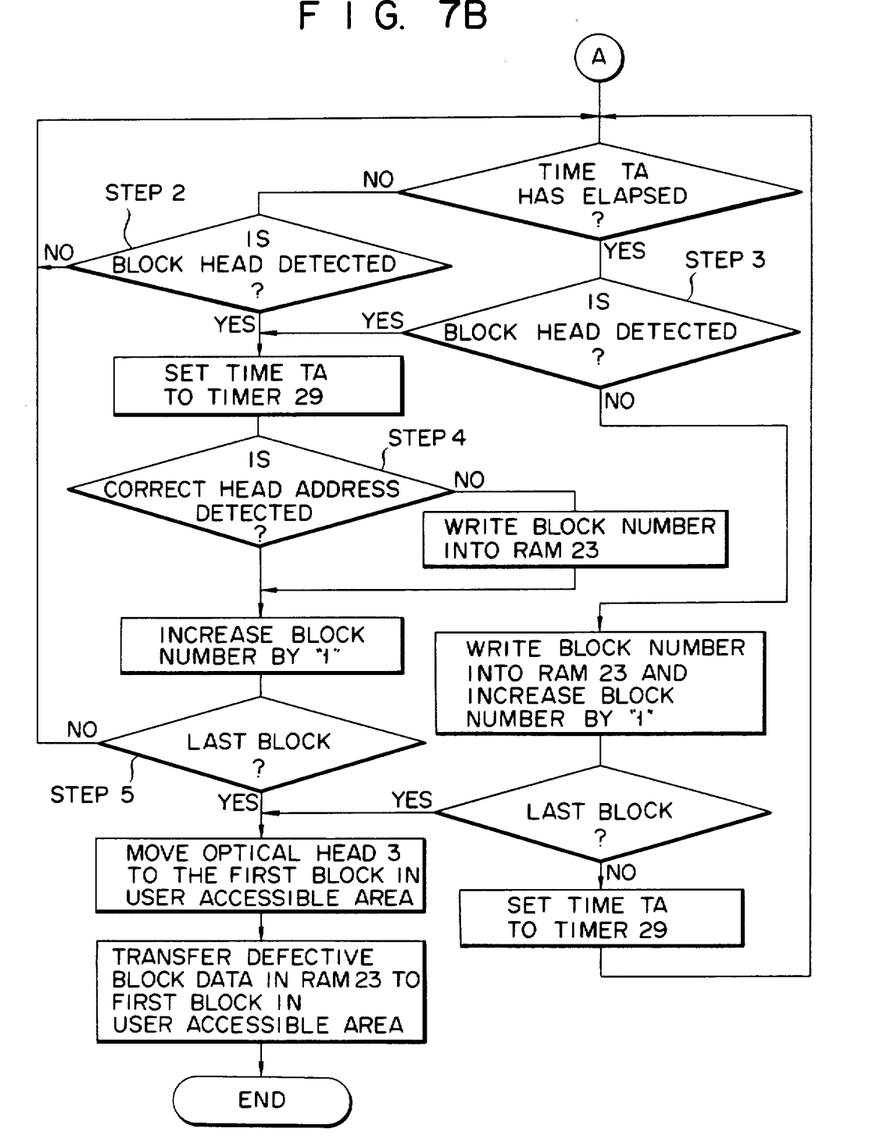

The detecting and recording operations of the defective blocks will then be explained with reference to flow charts shown in FIGS. 7A and 7B.

First, when the CPU 21 receives a defective-block detecting instruction from the host computer, the CPU 21 reads out the speed $V_i$, number $SN_i$ of sectors, starting sector position $SSP_i$, and first block number $FBN_i$ on the basis of the conversion table shown in FIG. 6 in order to allow the optical head 3 to access to the first block, thereby obtaining the track number $TN_i$ and starting sector position $SP_i$ of the desired block on the basis of equations (1) and (2). The CPU 21 generates the drive data to permit the disk memory 1 to rotate at the speed $V_i$, and at the same time it converts the track number $TN_i$ to the corresponding scale data $SD_{i}$; detects the travelling amount on the basis of the scale data indicating the position of the present optical head 3 and of the scale data $SD_{i}$; and allows the optical head 3 to be moved in the radial direction by the travelling distance calculated. Since the optical head 3 is first located at the reference position of the scale 10, the distance from this reference position to the first block is calculated in consideration of a difference between this reference position and the innermost track of the disk memory 1.

When the CPU 21 detects that the content of the counter 7 coincides with the starting sector position data $SP_i$, it gives an energization signal to the laser driver 14 and permits a weak laser beam to be irradiated onto the disk memory 1 from the optical head 3, thereby reading out the block head data in the first block. The CPU 21 reads out the head address data of the positive and negative phases at the timings determined by the data sync code included in the block head data of the first block. When the CPU 21 detects that the head address data cannot be read out at the timings determined by this data sync code in STEP 1, it regards this disk memory 1 as defective and informs this fact to the operator by, for example, lighting up a red lamp (not shown).

On the other hand, when the CPU 21 detects that the head address data could be read out in STEP 1, it gets the exclusive OR of the bits in each digit of the positive and negative phase head address data. When at least one exclusive OR signal of "0" is derived, this block is regarded as the defective block and the block number of this block is stored into the RAM 23. Further in this case, the CPU 21 sets the time TA necessary for the disk memory 1 to rotate by one block length with respect to the optical head 3 to the timer 29. Thereafter, the CPU 21 increases the block number by "1." In order to check the block head data in the second block to see if it is correct or not, the CPU 21 allows the disk memory 1 to rotate at the speed $V_i$ and permits the optical head 3 to move to the location designated by the block number of the second block as mentioned above. Before or when the timer 29 finishes counting, and when the CPU 21 detects the block head data of the second block in STEP 2 or STEP 3, it sets the time TA to the timer 29 and checks to see if this block head data is correct or not in STEP 4 by getting the exclusive OR between the respective bits of the positive and negative phase head address data in the similar manner as mentioned above. When it is detected that the head address data is incorrect in STEP 4, the CPU 21 regards this block as the defective block and stores the block number of this block into the RAM 23. Thereafter, the CPU 21 increases the block number by "1," allows the disk memory 1 to rotate at the speed $V_i$, and permits the optical head 3 to move in the radial direction by a predetermined distance in order to allow the optical head 3 to access onto the next block. The CPU 21 also similarly operates when the correct head address data is detected in STEP 4.

In contrast, in the case where the block head data is not detected yet even after completion of the counting operation of the timer 29, this block is regarded as the defective block and the block number of this block is stored into the RAM 23. After that, the CPU 21 increases the block number by "1." In order to check the block head data of the next block to see if it is correct or not, the CPU 21 executes an operation similar to that mentioned above after setting the time TA to the timer 29. Subsequently, the CPU 21 repeatedly executes a similar operation.

After the CPU 21 finishes STEP 4 and has increased the block number by one, and when it detects that the next block is the last block in STEP 5, the CPU 21 allows the optical head 3 to access onto the head block in the user accessible area. The block numbers of the defective blocks stored in the RAM 23 are sequentially read out and recorded on the disk memory 1. In the case where a plurality of successive defective blocks is stored, the block number of the head defective block and the number of successive defective blocks are recorded on the disk memory 1. On the other hand, if the correct block head is not detected in STEP 3, and if the CPU 21 detects that the next block is the last block in STEP 6 when the block number is increased by one, it allows the defective data stored in the RAM 23 to be transferred to the disk memory 1 in the manner mentioned above.

When the user uses the disk memory manufactured in this way in an image information recording and searching apparatus, the defective data stored in the disk memory is first stored in a control floppy disk (not shown). Due to this, when recording image data on this disk memory, the image data is inhibited from being recorded on the blocks designated by the defective data stored in this control floppy disk.

In the embodiment, since the user inaccessible area 1Y of, e.g., about 80 tracks is provided on the inside of the user accessible area 1Z, the access to the tracks in the user accessible area 1Z can be easily done. For instance, in the case of accessing the head block of the innermost track in the user accessible area 1Z, the CPU 21 converts the block number of this head block to the scale data and allows the optical head 3 to be moved toward the innermost track in the user accessible area 1Z in accordance with this scale data. In this case, since the optical head 3 is moved by the linear motor 12, it is difficult to just accurately set the optical head 3 to the desired track location. For instance, it is now assumed that the optical head 3 is set into the track location that is two tracks inside from the desired track location or from the innermost track in the area 1Z, that is, into the user inaccessible area 1Y. In such a case, since the blocks have been allocated in the tracks of the user inaccessible area 1Y, the CPU 21 can accurately detect that the optical head 3 is located at the second track from the outside in the user inaccessible area 1Y. Although not shown, the CPU 21 supplies a voltage corresponding to this track error to the optical head 3 and changes the angle of the radial mirror to reflect the laser beam generated from the semiconductor laser generator in the optical head 3 in the direction of the objective lens, thereby deviating the laser beam from the objective lens by two tracks and radiating the laser beam onto the desired track.

As described above, in this embodiment, even in the case where the optical head 3 is located further inside from the innermost track of the user accessible area 1Z, the CPU 21 can accurately detect the track location where the optical head 3 exists since the block head data has also been stored in the user inaccessible area. Thus, the CPU 21 can allow the optical head 3 to access onto a desired track.

Although the invention has been described with respect to one embodiment, the invention is not limited to only this embodiment. For example, the user inaccessible area and non-recording area may be further provided outside of the user accessible area. Further, in place of providing the user inaccessible area and nonrecording area inside the user accessible area, the user inaccessible area and non-recording area may be provided in the outside of the user accessible area. This makes it possible to access onto the tracks in the user accessible area using the outermost track in the non-recording area as the reference position.

What is claimed is:

1. An optical disk recording and reproducing apparatus comprising:
   an optical disk memory having a non-recording area, an user accessible area and user inaccessible area provided between said non-recording area and said user accessible area, said user inaccessible area and an user accessible area each having a plurality of blocks, and a block head data representative of a block position on said disk being recorded in each of said blocks, said user inaccessible area having only block head data recorded in individual blocks, and no block head data being recorded in said non-recording area;

optical head means for effecting recording and reading operations with respect to said user accessible area of said optical disk memory;

head driver means for driving said optical head means; and data processing means for supplying an energization signal corresponding to the data to be recorded to said optical head means when said optical head means is located at said user accessible area, and for receiving a reproduction signal from said optical head means when said optical head means is located at said user accessible area or said user inaccessible area, said data processing means being program controlled by a control program to supply drive data to said head driver means for allowing the optical head means to perform a controlled access only onto a desired block in said accessible area and for repositioning said optical head means to said accessible area after receiving said reproduction signal from said optical head means being inadvertently located at said user inaccessible area.

2. An apparatus according to claim 1, wherein said non-recording area is formed on said disk radially inside said user inaccessible area.

3. An apparatus according to claim 2, wherein at least one user inaccessible area and at least one non-recording area are formed on said disk radially outside said user accessible area.

4. An apparatus according to claim 1, wherein said non-recording area is formed on said disk radially outside said user inaccessible area.

5. An apparatus according to claim 1, wherein said user inaccessible area includes a plurality of tracks.

6. An optical disk recording and reproducing apparatus for an optical disk memory having a non-recording area, an user accessible area and an user inaccessible area provided between said non-recording area and said user accessible area, said user inaccessible area and user accessible area each having a plurality of blocks, and a block head data representative of a block position on said disk being recorded in each of said blocks, said user inaccessible area having only block head data recorded in individual blocks, and no block head data being recorded in said non-recording area, said apparatus comprising:

optical head means for effecting recording and reading operation with respect to said user accessible area of said optical disk memory;

head driver means for driving said optical head means;

memory means for storing a control program; and data processing means for supplying an energization signal corresponding to the data to be recorded to said optical head means when said optical means is located at said user accessible area, and for receiving a reproduction signal from said optical head means when said optical head means is located at said user accessible area or said user inaccessible area, said data processing means being program controlled by the control program stored in said memory means to supply drive data to said head driver means for allowing the optical head means to perform a controlled access only onto a desired block in said accessible area and for repositioning said optical head means to said accessible area after receiving said reproduction signal from said optical head means being inadvertently located at said user inaccessible area.

* * * * *